Dec. 31, 1935.  F. O. HARTMAN  2,025,859
OSCILLATING MOTOR CIRCUIT CONTROLLER
Filed May 24, 1932  2 Sheets-Sheet 1

INVENTOR:
FRANK O. HARTMAN
ATTORNEYS

Dec. 31, 1935.   F. O. HARTMAN   2,025,859
OSCILLATING MOTOR CIRCUIT CONTROLLER
Filed May 24, 1932   2 Sheets-Sheet 2

INVENTOR:
FRANK O. HARTMAN
ATTORNEYS

Patented Dec. 31, 1935

2,025,859

UNITED STATES PATENT OFFICE 2,025,859

OSCILLATING MOTOR CIRCUIT CONTROLLER

Frank O. Hartman, Mansfield, Ohio, assignor, by mesne assignments, to Universal Neon Equipment Company Application May 24, 1932, Serial No. 613,327

17 Claims. (Cl. 200—90)

This invention relates to luminous tube devices, etc., and more particularly to an electric luminous tube device used for signaling or advertising purposes, and to a device for intermittently supplying current to said tube.

An object of the invention is the provision of a novel compact electric luminous tube device including a circuit maker or "flasher" for intermittently illuminating or flashing the tube, which will be simple in construction, inexpensive to manufacture, and economical and reliable in operation.

Another object of the invention is the provision of a novel device of the character referred to above which will be self-contained, will have a low energy consumption, may be operated from a battery, and will operate for long periods of time without attention.

A further object of the invention is the provision of a novel circuit making device or "flasher" which will be compact, simple in construction, low in energy consumption, positive and reliable in operation, and will operate in any position in which it may be placed.

The invention resides in certain novel details of construction and combinations and arrangements of parts, and further objects and advantages will be apparent to those skilled in the art from the following description of the preferred embodiment of the invention described with reference to the accompanying drawings, in which.

Similar reference characters designate corresponding parts throughout the several figures of the drawings.

Figure 1:
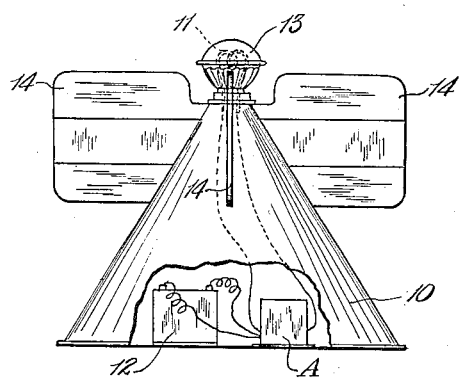
Fig. 1 is a front elevation of a signal device embodying the present invention.

Referring to the drawings, Fig. 1 illustrates a self-contained portable luminous device particularly adapted for air ship signaling, marking landing fields, or directing motor vehicle traffic etc. The reference character 10 designates the cone shaped housing of the device which supports a luminous gas tube 11 and encloses the control unit designated in general by the reference character A, and a battery 12. In the embodiment of the invention illustrated, the luminous tube 11 is a neon gas tube in the form of a loop and is enclosed in a globe 13, but it is readily understood that other luminous tubes and forms may be employed. A plurality of wings 14 carried by the housing 10 prevent injury to the tube or globe if the device is accidentally overturned, and may be used to display advertising material etc.

Figure 2:
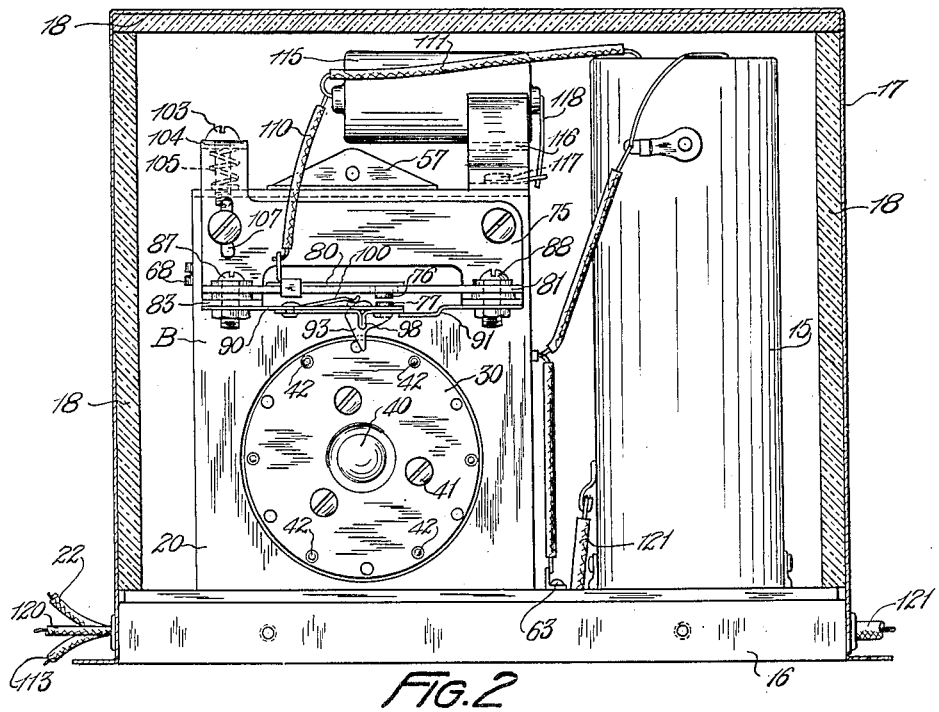
Fig. 2 is a front elevation of the control unit with the cover in section.
Figure 3:
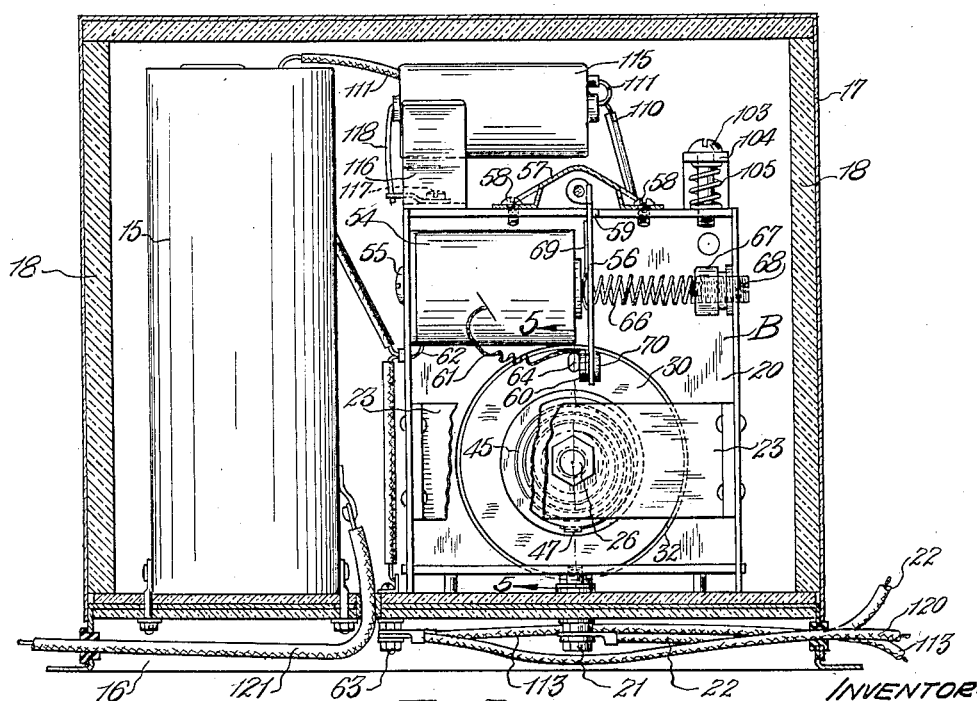
Fig. 3 is a rear elevation of the control unit with portions broken away and the enclosing structure in section.

The control unit comprises a circuit maker or "flasher" designated in general by the reference character B and a transformer 15, preferably of the induction coil type, see Figs. 2 and 3, enclosed in a metal box, comprising a base 16 and a removable cover 17. The interior of the box is lined with suitable insulating material 18 to prevent short circuits etc. The circuit maker or "flasher" B comprises a frame 20 attached to the base 16 in any suitable manner, as by the bolt 21 which in the modification illustrated also acts as a terminal for the positive battery lead 22 grounded to the frame 20.

Figure 5:
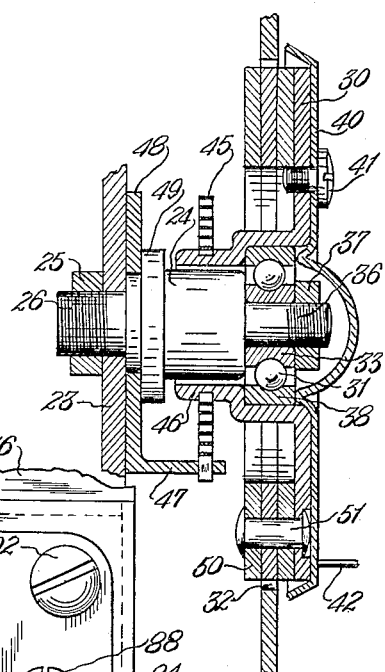
Fig. 5 is a section on the line 5—5 of Fig. 3 with portions in elevation looking in the direction of the arrows.

A cross member 23, see Figs. 3 and 5, riveted to the frame 20 supports a stud shaft 24 secured thereto by means of a nut 25 threaded on a reduced end 26 of said shaft. An oscillatory momentum member 30 in the form of a balance wheel rotatably supported on the free end of the stud shaft 24 by anti-friction bearing in the form of balls 31 projects through a suitable aperture 32 in the frame 20. The inner race 33 of the anti-friction bearing is retained on a reduced end 36 of the stud shaft 24 by a nut 37 and the outer race 38 is secured to the oscillatory member 30, preferably by friction.

A cover plate 40 secured to the front of the oscillatory member 30, as viewed in Fig. 2, by screws 41, assists in retaining the outer race 38 of the anti-friction bearing in position, forms a cover for said bearing, and supports a plurality of projections in the form of pins 42 secured thereto at spaced intervals for a purpose hereinafter described.

A spiral spring 45 connected at one end to the hub 46 of the oscillatory member 30 and at the other end to an arm 47 continuously urges the oscillatory member 30 in a counterclockwise direction, as viewed in Fig. 2. The arm 47 is formed integral with a disk member 48 supported on the stud shaft 24, and adjustable thereabout to vary the tension of the spring 45. The disk member 48 is held in any adjusted position by friction between it and the cross member 23 and an enlarged part 49 of the stud shaft 24. Annular members 50 are secured to the rear of the oscillatory member 30, as by the rivets 51 to give it the required mass.

An electromagnet 54, secured to the upper corner of the frame 20 by a screw 55, attracts an armature 56 pivotally supported in a member 57 secured to the frame 20, as by the screws 58. The armature 56 projects through a suitable slot 59 in the housing 20, the sides of which may be used as positive stops for limiting the movement of said armature. In the embodiment illustrated the side of the slot remote from the electromagnet 54 is so used.

A contact 60 carried by the armature 56 and insulated therefrom is connected to one end of the winding of the electromagnet 54 by a lead wire 61. The other end of the electromagnet winding is connected, by a lead wire 62, to a terminal post 63, which in turn is connected to the negative side of the battery. The contact 60 projects in the path of movement of a pin contact 64 carried by the oscillatory member 30, which contact completes the circuit through the electromagnet 54 when the same is in engagement with the contact 60. The spiral spring 45 continuously urges the oscillatory member 30 in a direction to engage the contact 64 with the contact 60 and when the contact 64 strikes the contact 60 the circuit is closed through the electromagnet 54, which in turn attracts the armature 56 and imparts a reverse impulse to the oscillatory member 30.

A coil spring 66 supported at one end in a sleeve member 67, riveted or otherwise secured to the frame 20, abuts the armature 56, continuously urges said armature towards the electromagnet 54, acts as a resilient stop for said armature and oscillatory member, stores energy expended in bringing the oscillatory member to rest when the pin contact 64 strikes the contact 60, and returns the energy stored therein to the oscillatory member 30 at the beginning of the reverse movement thereof. The tension of the spring 66 is adjusted by means of a screw 68 threaded into the sleeve member 67. When the circuit through the electromagnet 54 is open the armature is held spaced therefrom by a leaf spring 69 secured to said armature and engaging the core of said electromagnet.

An insulating stop 70, secured to the opposite side of the armature 56 from the contact 60, is positioned to engage the pin contact 64 and limit the movement of the oscillatory member 30 in a counterclockwise direction, as viewed in Fig. 3.

A bracket 75 secured to the frame 20 supports contacts 76 and 77 in series with the low voltage winding 78 of the transformer 15. The contact 76 is carried by a spring arm 80, secured to a cross member 81 supported on projections 82 and 83 formed integral with the bracket 75. The cross member 81 is insulated from the projections 82 and 83 by means of insulating washers 84 and 85 and secured thereto by bolts 87 and 86. The contact 77 is carried by a spring arm 90, secured at one end to the projection 83 by the bolt 87. A stop member 91, carried by the projection 82 of the bracket 75, is adapted to engage the free end of the spring arm 90 and limit the movement of the same in a direction to open the contacts 76 and 77. The distance between the contacts 76 and 77 when in their open position may be adjusted by bending the stop member 91.

A pawl 93, pivotally supported in an elongated slot in the spring arm 90 on a pin 94 carried by the spring arm 90, is adapted to project in the path of the pins 42 and be engaged thereby as the oscillatory member 30 rotates. The pin 94 is secured to the spring arm 90 by a member 95 having an elongated slot through which the pawl 93 projects and secured thereto as by the rivets 96 and 97. The member 95 is bent adjacent the pin 94 to form projecting guides 98 at either side of the pawl 93. The movement of the pawl 93 in one direction is limited by the engagement of a projection 99 thereon with the rivet 97 which may also secure the contact 77 to the spring arm 90. The pawl 93 is continuously urged in a direction to engage the projection 99 with the rivet 97 by a spring 100 cut out of the spring arm 90 to form the elongated slot in which the pawl is positioned. The construction of the spring arm 90, the pawl 93, etc., is such that the pins 42 will pass under said pawl in one direction as the oscillatory member 30 oscillates without closing the contacts 76 and 77, but, as the momentum member moves in the reverse direction, the pins 42 engage the pawl 93 to move the spring arm 90 and close said contacts.

Figure 4:
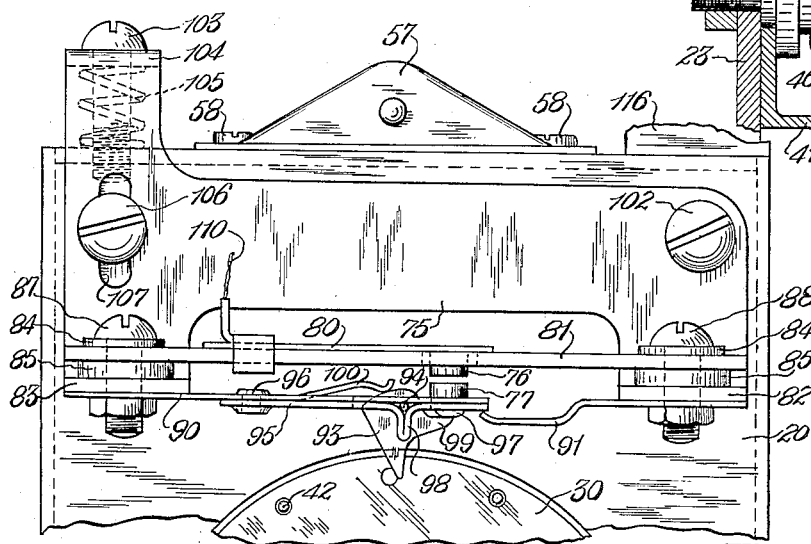
Fig. 4 is an enlarged elevation of a portion of Fig. 2.
Figure 6:
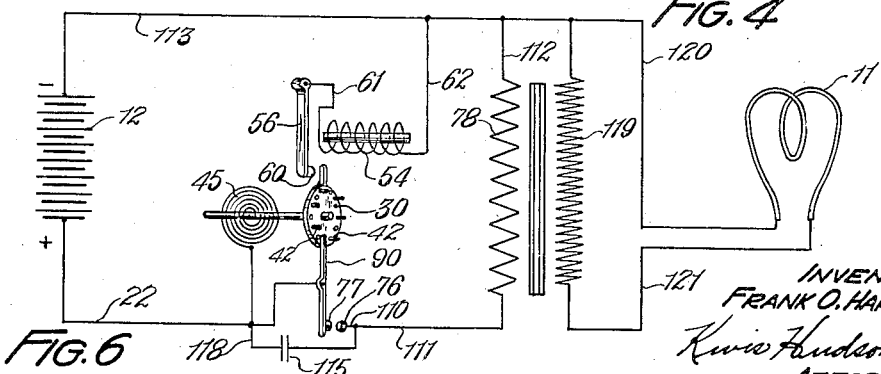
Fig. 6 is a schematic wiring diagram illustrating the position of the various parts in the electric circuit.

The bracket 75 is adapted to be adjusted about the screw 102, which secures it to the frame 20, as a pivot by means of a screw 103 threaded into the frame 20 and engaging a projection 104 on the bracket 75. The bracket 75 is continuously urged in a clockwise direction, as viewed in Figs. 2 and 4, by a spring 105 compressed between the frame 20 and the projection 104 on said bracket. A lock screw 106 threaded into the frame 20 and extending through an elongated slot 107 in the bracket 75 is adapted to lock said bracket in any adjusted position. By adjusting the bracket 75 about the screw 102 as a pivot, the length of time during which the contacts 76 and 77 are in engagement, as one of the pins 42 passes under the pawl 93, may be varied. The contact 76 is connected by means of lead wires 110 and 111 to one side of the low voltage winding 78 of the transformer 15, the other side of which is connected by lead wires 112 and 113 to the negative side of the battery. The contact 77 is grounded to the frame 20. A condenser 115, supported by a bracket 116 secured to the frame 20 by a screw 117, is connected across the contacts 76 and 77 by the lead wires 110 and 118. The high voltage winding 119 of the transformer 15 is connected with the luminous gas tube 11 by lead wires 120 and 121.

The operation of the device is as follows: With the battery 12 disconnected the device is at rest and deenergized in the positions illustrated in Figs. 2 and 3. The contact 64 is in engagement with the contact 60 under the action of the spring 45 and the armature 56 is held in spaced relation from the electromagnet 54 by the spring 69. When the battery 12 is connected to the circuit the electromagnet 54 is energized, since the circuit therethrough is closed by the contacts 60 and 64. The armature 56 is attracted to the electromagnet, imparting an impulse to the momentum member 30. The movement of the armature 56 is limited by the core of the electromagnet 54, and the inertia of the momentum member 30 carries the contact 64 away from the contact 60, breaking the circuit through said electromagnet and allowing the armature to return to its original position. The oscillatory member 30 continues to rotate against the force of the spring 45, until the energy imparted thereto is expended, or until the contact 64 strikes the stop 70, after which its direction of rotation is reversed by the action of the spring 45.

As the oscillatory member 30 moves in a reverse direction, that is in a clockwise direction, as viewed in Fig. 3, the contact 64 strikes the contact 60, closing the circuit to the electromagnet 54 and compressing the spring 66 which resiliently stops the rotation of said oscillatory member. The armature 56 is then moved in a direction to impart an impulse to the oscillatory member 30 in a counterclockwise direction, by the combined force of the electromagnet and the energy stored in the spring 66, and the cycle of operation repeated indefinitely.

Upon each oscillation of the oscillatory member 30 the contacts 76 and 77 are closed a plurality of times by the pins 42 supported by said oscillatory member 30. Upon each closing of the contacts 76 and 77 the circuit is closed through the low voltage winding 78 of the transformer 15, which, in turn, produces a high voltage flash through the luminous gas tube 11. The pins 42 may be formed integral with the cover 40 or secured thereto in any suitable manner and the number and position thereof may be varied so that the number and sequence of the flashes through the tube 11 may be varied as desired. Various codes may be flashed by the tube 11 by locating the pins 42 at various predetermined distances apart. It will be apparent that, by locating two or more of the pins 42 relatively close together, a plurality of flashes may be obtained in such rapid succession that they appear to be one continuous long flash.

From the foregoing description, it will be apparent that a novel flashing light device has been provided which will operate for long periods of time without attention, irrespective of the position in which it is supported, with low current consumption. The impulse imparted to the oscillatory member by the spring 66 is coincident with the impulses resulting from the attraction of the armature 56 by the electromagnet, and the weight of the various parts and the resistance of the springs are so proportioned to give maximum efficiency, producing a maximum impulse for a minimum power input. The circuits to the transformer or light and the electromagnet are closed for very short intervals, resulting in a very low current consumption. A device of the type described comprising a neon luminous tube of approximately two feet in length and a closed circuit transformer having a ratio of approximately 1 to 3000 turns is designed to operate, for months, without attention, from a six-volt dry battery.

The preferred embodiment of the invention has been illustrated and described, but it is understood that the invention may be embodied in various constructions, or may be operated from any electric source other than the battery shown. I do not wish to be limited to the particular construction illustrated and disclosed, and I particularly point out and claim as my invention:

1. A control device for an electric circuit, comprising a frame, a momentum member pivotally supported by said frame, a spring operatively connected to said momentum member for continuously urging said momentum member in one direction, an electromagnetic means for imparting an impulse to said momentum member in a direction opposite to the force of said spring, means controlled by the movement of said momentum member for closing an electric circuit to said electromagnetic means, and means controlled by the movement of said momentum member for closing a normally open second electric circuit a predetermined plurality of times in rapid succession.

2. A control device for an electric circuit comprising a frame, a momentum member rotatably supported by said frame, means for oscillating said momentum member, a plurality of normally open contacts supported by said frame adjacent said momentum member, and means for closing said contacts a plurality of times during movement of said momentum member in one direction and for permitting movement of said momentum member in one direction without actuation of said contacts.

3. A control device for an electric circuit comprising a frame, a momentum member rotatably supported by said frame, means for oscillating said momentum member, a plurality of contacts supported by said frame adjacent said momentum member, a pawl supported by one of said contacts, and means supported by said momentum member adapted to engage said pawl upon oscillation of said momentum member.

4. A control device for an electric circuit comprising a frame, a momentum member pivotally supported by said frame, a spring connected to said momentum member for continuously urging said momentum member in one direction, an electromagnetic means supported by said frame for imparting an impulse to said momentum member in a direction opposite to the force of said spring, an electric circuit for actuating said electromagnetic means, means controlled by the movement of said momentum member for closing said electric circuit, a plurality of normally open contacts supported by said frame, and means controlled by the movement of said momentum member in one direction for closing said contacts a predetermined plurality of times during each oscillation of said momentum member.

5. A control device for an electric circuit comprising a frame, a momentum member rotatably supported by said frame, a spring connected to said momentum member for continuously urging said momentum member in one direction, an electromagnet supported by said frame, an armature pivotally supported by said frame adjacent said electromagnet, a contact carried by said momentum member, a second contact carried by said armature adapted to project in the path of movement of said contact carried by said momentum member and limit the movement of said member in one direction, said contacts being adapted to close an electric circuit to said electromagnet whereby an impulse is applied to said momentum member in a direction opposite to the force of said spring near the end of its movement in one direction, resilient means supported adjacent said armature adapted to store energy expended in stopping said momentum member and return the same to said momentum member as it starts its movement in the opposite direction, and means controlled by the movement of said momentum member in one direction for closing an electric circuit a plurality of times.

6. A control device for an electric circuit comprising a frame, a momentum member rotatably supported by said frame, a spring connected to said momentum member for continuously urging said momentum member in one direction, a member supported by said housing, a contact carried by said momentum member, a contact carried by said member adapted to project into the path of movement of said contact carried by said momentum member and thereby limit the movement of said momentum member under the force of said spring, electromagnetic means for moving said member adapted to impart a reverse impulse to said momentum member actuated by the closing of said contacts, resilient means supported adjacent said member adapted to store energy expended in stopping said oscillatory member and return the same to said momentum member as it starts its movement in the reverse direction, a pair of normally open contacts supported by said frame, and means controlled by the movement of said momentum member for closing said contacts.

7. A control device for an electric circuit comprising a frame, a momentum member rotatably supported by said frame, a spring connected to said member for continuously urging said momentum member in one direction, electromagnetic means for imparting an impulse to said momentum member in a direction opposite to the force of said spring, an electric circuit for controlling said electromagnetic means, means controlled by the movement of said momentum member for closing said electric circuit, a plurality of normally open contacts supported by said frame adjacent said momentum member, a plurality of projections on said momentum member, a pawl member pivotally supported by one of said contacts adapted to project in the path of said projections, and means for limiting the rotation of said pawl member in one direction about its pivotal axis whereby said contacts are closed upon movement of said momentum member in one direction only.

8. A control device for an electric circuit comprising a frame, a momentum member rotatably supported by said frame, a spring operatively connected to said momentum member for continuously urging said momentum member in one direction, an electromagnet supported by said frame, an armature pivotally supported by said frame adjacent said electromagnet, a contact carried by said momentum member, a second contact carried by said armature adapted to project in the path of movement of said contact carried by said momentum member, said contacts being adapted to close an electric circuit to said electromagnet whereby an impulse is applied to said momentum member in a direction opposite to the force of said spring, resilient means supported adjacent said armature adapted to arrest the rotation of said momentum member and impart an impulse to said momentum member as it starts its movement in a reverse direction, a plurality of contacts supported by said frame adjacent said momentum pawl member, a member pivotally supported by one of said contacts, and means on said momentum member adapted to engage said pawl member for closing said contacts a predetermined plurality of times during the oscillation of said momentum member in one direction.

9. A circuit controlling device comprising a movable contact member, and an electrically actuated oscillatory member having a portion movable back and forth past the contact member, one of said parts having a pawl by which the contact member is actuated when the oscillatory member is moved in one direction only.

10. A circuit controlling device including a movable contact member adapted to be shifted into engagement with a cooperating contact member, an oscillatory actuating member for shifting the movable contact member periodically, electrical means for actuating the oscillatory member, and a pawl carried by the movable contact member and arranged in a manner such that the oscillatory member will shift the movable contact member when it oscillates in one direction only.

11. A circuit controlling device including an oscillatory member, motive means including a coil adapted to be periodically energized for causing said member to oscillate, contact means adapted to be closed by the oscillatory member when the latter is near the end of its movement in one direction, a movable contact member, and means carried by said oscillatory member for actuating said movable contact member when the oscillatory member is moving in one direction.

12. A control device for an electric circuit comprising a frame, a momentum member, means for rotatably supporting said momentum member in said frame about a horizontal axis, a spiral spring operatively connected to said momentum member and said frame for continuously urging said momentum member in one direction, an electromagnet supported by said frame, an armature pivotally supported by said frame adjacent said electromagnet, a contact in the electric circuit for said electromagnet carried by said momentum member, a cooperating contact carried by said armature adapted to project in the path of movement of the first mentioned contact, the engagement of said contacts being adapted to close an electric circuit to said electromagnet whereby an impulse is applied through said armature to said momentum member in a direction opposite to the force of said spring, resilient means supported by said frame adjacent said armature for arresting the rotation of said momentum member in a direction to close said contacts and for imparting an impulse to said momentum member as it starts its movement in a reverse direction, a bracket supported by said frame, a plurality of contacts supported by said bracket adjacent said momentum member, a pawl pivotally supported by one of said last mentioned contacts, projections on said momentum member adapted to engage said pawl for closing said last mentioned contacts a predetermined plurality of times during the oscillation of said momentum member in one direction only, and means for adjusting said bracket relative to said momentum member whereby said pawl is adjusted with reference to said projections and the duration that the last mentioned contacts remain closed may be controlled.

13. A control device for an electric circuit comprising a frame, a momentum member rotatably supported by said frame, means for oscillating said momentum member, a pair of normally open contacts, and means for closing said contacts a predetermined plurality of times in rapid succession upon rotation of said momentum member.

14. A control device for an electric circuit comprising a frame, a momentum member rotatably supported by said frame, means for oscillating said momentum member, a pair of normally open contacts, and means for closing said contacts a plurality of times upon rotation of said momentum member in one direction only.

15. A control device for an electric circuit comprising a frame, a momentum member rotatably supported by said frame and provided with a plurality of projections, means for oscillating said momentum member, a pair of contacts supported by said frame adjacent said momentum member, and means in the path of the projections for closing said contacts upon movement of said momentum member in one direction only.

16. A control device for an electric circuit comprising a frame, a momentum member rotatably supported by said frame and provided with a plurality of projections, means for oscillating said momentum member, a pair of normally open contacts supported by said frame adjacent said momentum member, a lever pivotally supported by one of said contacts and extending into the path of said projections, and means for limiting the rotation of said lever in one direction only as it is engaged by said projections whereby said contacts are closed upon movement of said momentum member in one direction only.

17. A control device for an electric circuit comprising a frame, a momentum member rotatably supported by said frame and provided with a plurality of projections, means for oscillating said momentum member, a pair of normally open contacts supported by said frame adjacent said momentum member, means for adjusting said contacts relative to said momentum member, a lever pivotally supported by one of said contacts and extending in the path of said projections, and means for limiting the rotation of said lever in one direction only as it is engaged by said projections whereby said contacts are closed by movement of said momentum member in one direction only.

FRANK O. HARTMAN.